United States Patent
Collins

(10) Patent No.: US 7,882,226 B2
(45) Date of Patent: Feb. 1, 2011

(54) SYSTEM AND METHOD FOR SCALABLE AND REDUNDANT COPS MESSAGE ROUTING IN AN IP MULTIMEDIA SUBSYSTEM

(75) Inventor: David Allan Collins, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1148 days.

(21) Appl. No.: 10/975,755

(22) Filed: Oct. 28, 2004

(65) Prior Publication Data

US 2005/0071455 A1   Mar. 31, 2005

Related U.S. Application Data

(63) Continuation-in-part of application No. 10/038,878, filed on Dec. 31, 2001, now Pat. No. 6,947,752.

(51) Int. Cl.
*G06F 15/173* (2006.01)
*G06F 9/46* (2006.01)

(52) U.S. Cl. ...................................... 709/225; 718/105

(58) Field of Classification Search ................. 709/227, 709/220–222, 225; 714/25; 718/105
See application file for complete search history.

(56) References Cited

U.S. PATENT DOCUMENTS

| | | | | |
|---|---|---|---|---|
| 5,708,654 | A * | 1/1998 | Arndt et al. | 370/242 |
| 5,923,854 | A * | 7/1999 | Bell et al. | 709/243 |
| 2004/0008717 | A1 * | 1/2004 | Verma et al. | 370/432 |
| 2004/0205193 | A1 * | 10/2004 | Hurtta et al. | 709/227 |
| 2005/0108568 | A1 * | 5/2005 | Bussiere et al. | 713/201 |
| 2005/0149754 | A1 * | 7/2005 | Rasanen | 713/201 |
| 2006/0039364 | A1 * | 2/2006 | Wright | 370/352 |

* cited by examiner

*Primary Examiner*—Nathan Flynn
*Assistant Examiner*—Chirag Patel

(57) ABSTRACT

An Internet Protocol (IP) multimedia subsystem for use in a telecommunication network. The IP multimedia subsystem comprises: 1) an IP switch for receiving Common Open Policy Service (COPS) protocol messages from an external IP network; and 2) a plurality of call application nodes capable of executing a plurality of Policy Decision Function (PDF) application groups. The IP switch distributes the COPS messages to the plurality of call application nodes according to a load-sharing algorithm.

20 Claims, 3 Drawing Sheets

SYSTEM AND METHOD FOR SCALABLE AND REDUNDANT COPS MESSAGE ROUTING IN AN IP MULTIMEDIA SUBSYSTEM

CROSS-REFERENCE TO RELATED APPLICATION

The present invention is related to that disclosed in U.S. patent application Ser. No. 10/038,878, filed on Dec. 31, 2001 and entitled "System and Method for Distributed Call Processing Using Load-Sharing Groups." Patent application Ser. No. 10/038,878 is assigned to the assignee of the present application. The subject matter disclosed in patent application Ser. No. 10/038,878 is hereby incorporated by reference into the present disclosure as if fully set forth herein. The present application is a continuation-in-part (CIP) of patent application Ser. No. 10/038,878, filed on Dec. 31, 2001, now U.S. Pat. No. 6,947,752 and hereby claims priority under 35 U.S.C. §120 to the filing date of patent application Ser. No. 10/038,878.

TECHNICAL FIELD OF THE INVENTION present invention generally relates to telecommunication systems and, more specifically, to a scalable and redundant IP multimedia subsystem (IMS) for performing COPS message routing.

BACKGROUND OF THE INVENTION

The 3GPP standard describes an Internet Protocol (IP) multimedia subsystem (IMS) that comprises the core network (CN) devices that provide IP multimedia services, including audio, video, text, chat and the like, and combinations thereof, delivered over the Internet and/or the public switched telephone network. Conventional IP multimedia subsystems generally comprise an IP switch and a single server. As network loading increases, more processors may be added to the server to cope with the increased throughput requirements.

However, at some point, adding more processors becomes inadequate due to limitations in the capacity of the server. For example, the bandwidth of the server may limit the usefulness of this approach. In a number of systems, it is not possible to add more processors. At that point, faster and more powerful processors must be added, which also is a limited approach.

Also, the conventional architecture of an IP switch and a single server is limited by a single point of failure. If the server fails, then all service is lost. The prior art IP multimedia subsystems use the IP switch to detect when a node has failed. The conventional IP multimedia subsystems do not detect when a server has failed.

Therefore, there is a need in the art for an improved IP multimedia subsystem that is capable of providing scalable service to cope with increased traffic requirements. In particular, there is a need for an IP multimedia subsystem that does not contain a single point of failure.

SUMMARY OF THE INVENTION

The present invention provides for the easy expansion of the number of nodes in an IP multimedia subsystem (IMS) in order to handle the expected network traffic. The IMS is more fault-tolerant because for any failure by a node, application server, or application level gateway, a backup device takes over to continue to provide service.

To address the above-discussed deficiencies of the prior art, it is a primary object of the present invention to provide an Internet Protocol (IP) multimedia subsystem for use in a telecommunication network. According to an advantageous embodiment of the present invention, the IP multimedia subsystem comprises: 1) an IP switch capable of receiving Common Open Policy Service (COPS) messages from an external gateway GPRS support node; and 2) a plurality of call application nodes capable of executing a plurality of Policy Decision Function (PDF) application groups. The IP switch distributes the COPS messages to the plurality of call application nodes according to a load sharing algorithm.

According to one embodiment of the present invention, a first one of the plurality of PDF application groups is executed on a first one of the plurality of call application nodes and is associated with a similar second one of the plurality of PDF application groups executed on a second one of the plurality of call application nodes separate from the first call application node.

According to another embodiment of the present invention, the first and second PDF application groups form a first load-sharing group service application.

According to still another embodiment of the present invention, the first PDF application group comprises a first primary application executed on the first call application node and a first backup application associated with the first primary application.

According to yet another embodiment of the present invention, the first backup application resides on a call application node other than the first call application node.

According to a further embodiment of the present invention, the IP multimedia subsystem further comprises a plurality of front-end nodes capable of executing a plurality of application level gateway (ALG) application groups, wherein the IP switch distributes the COPS messages to the plurality of front-end nodes for subsequent distribution to the plurality of call application nodes.

According to a still further embodiment of the present invention, a first of the plurality of ALG application groups comprises a first primary ALG application executed on the first call application node and a first backup ALG application associated with the first primary ALG application.

According to a yet further embodiment of the present invention, the first backup ALG application resides on a call application node other than the first call application node.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
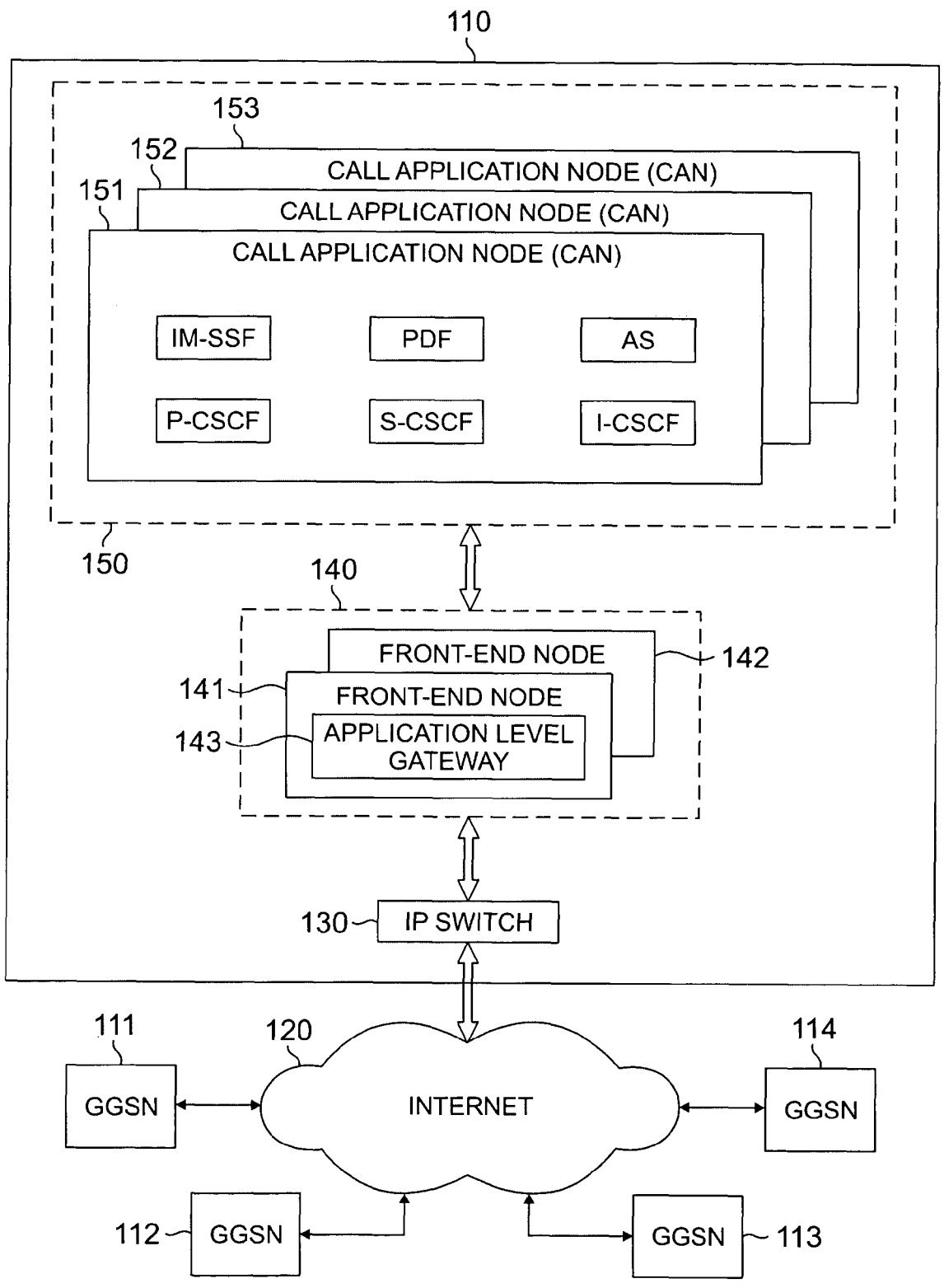
FIG. 1 illustrates a telecommunication network comprising an IP multimedia subsystem (IMS) according to the principles of the present invention.
Figure 2:
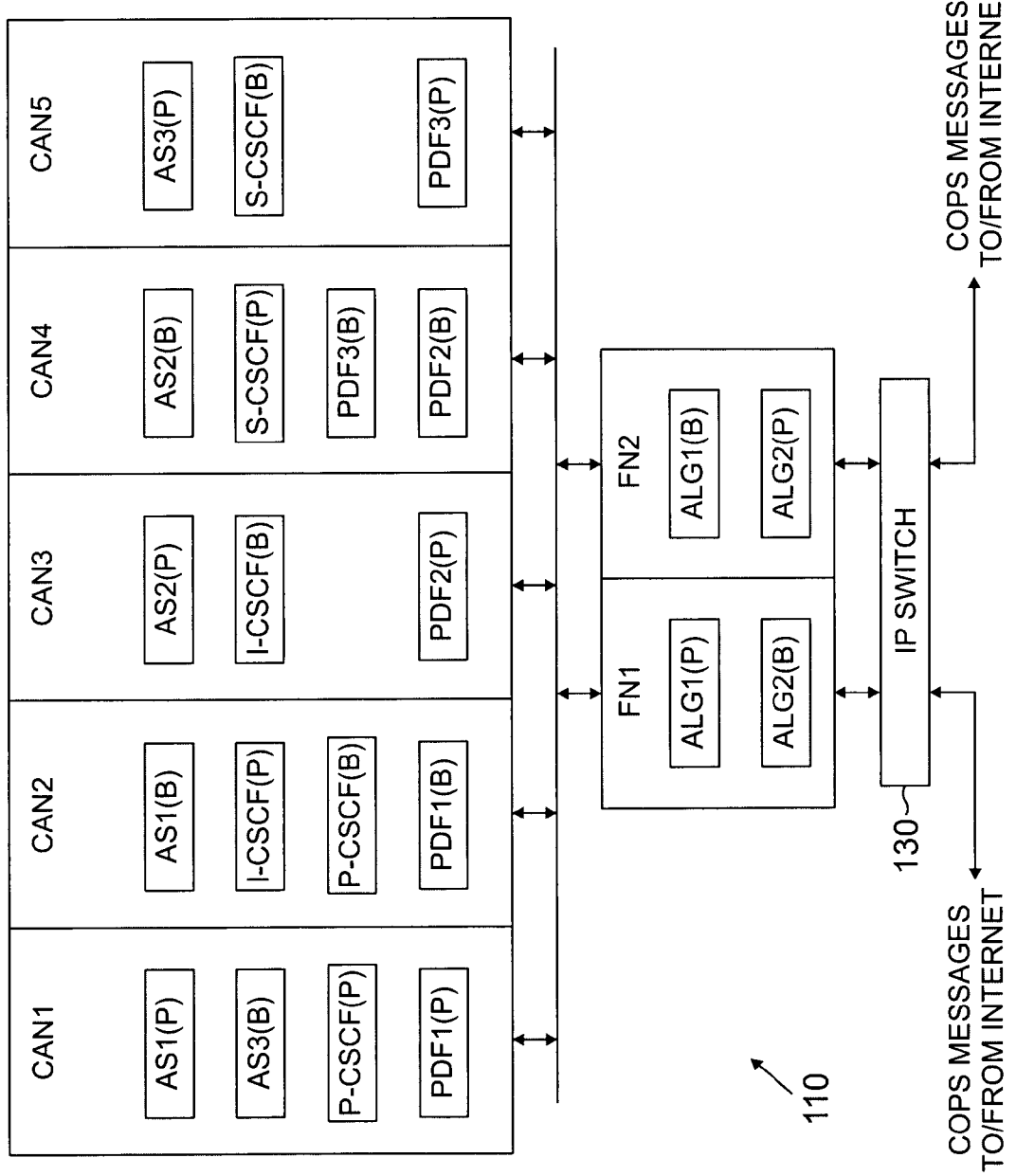
FIG. 2 illustrates the IP multimedia subsystem (IMS) in greater detail according to an exemplary embodiment of the present invention.
Figure 3:
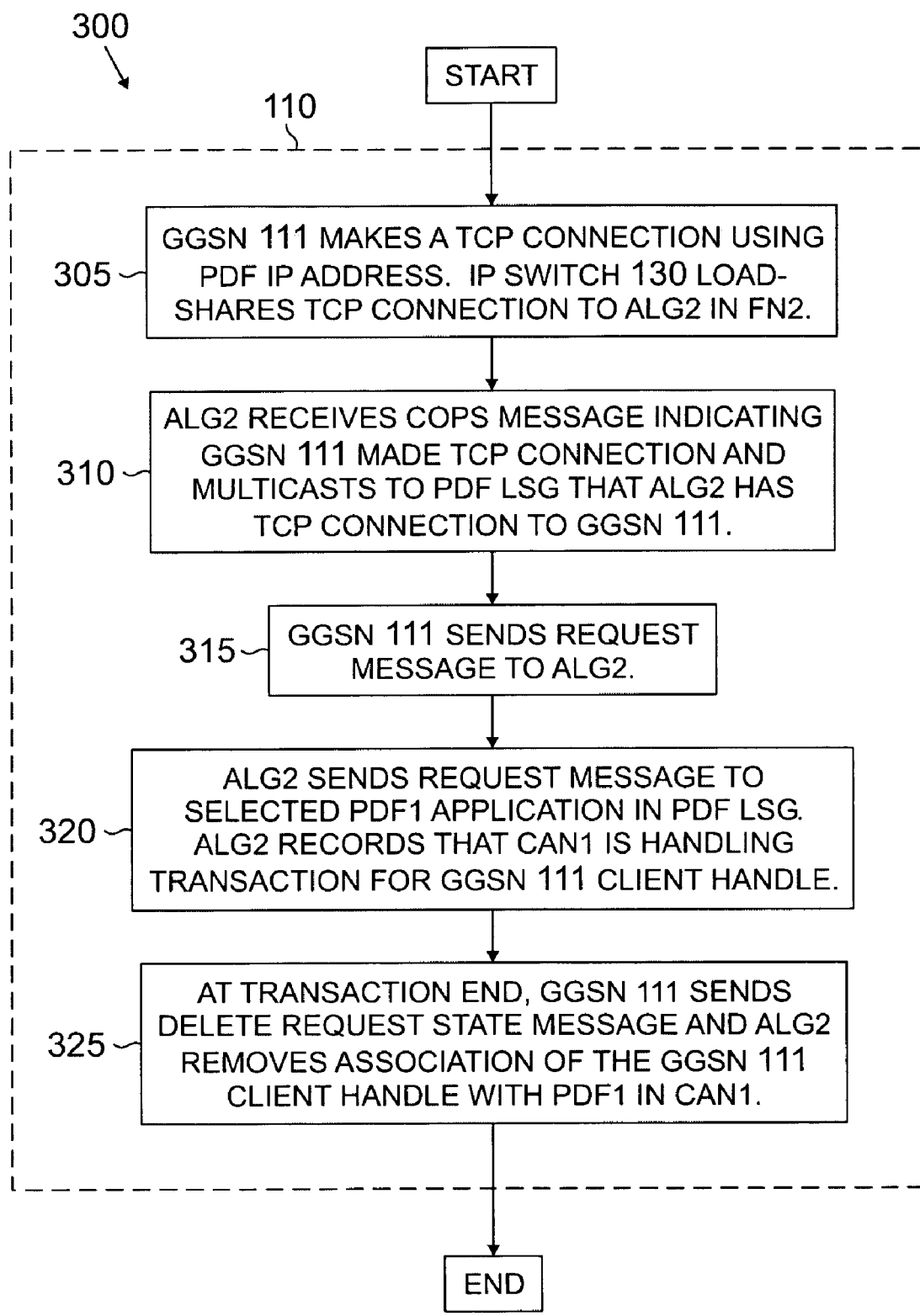
FIG. 3 is a flow diagram illustrating the operation of the IP multimedia subsystem (IMS) according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged IP multimedia subsystem.

FIG. 1 illustrates telecommunication network 100, which comprises IP multimedia subsystem (IMS) 110 according to the principles of the present invention. Telecommunication network 100 comprises IP multimedia subsystem (IMS) 110, gateway GPRS support node (GGSN) 111, gateway GPRS support node (GGSN) 112, gateway GPRS support node (GGSN) 113, and gateway GPRS support node (GGSN) 114. Gateway GPRS support nodes 111-114 communicate with IMS 110 according to the General Packet Radio Service (GPRS) protocol via a public or a private Internet Protocol (IP) network, such Internet 120. Alternatively, gateway GPRS support nodes 111-114 may communicate with IMS 110 via the public switched telephone network (PSTN).

IP multimedia subsystem (IMS) 110 provides IP multimedia services including, for example, streaming audio, streaming video, text messaging, chat, and the like, to end-user devices 111-114 over Internet 120. IMS 110 comprises Internet protocol (IP) switch 130, front-end (or firewall) server group 140, and application server group 150. Front-end server group 140 comprises a plurality of front-end (or firewall) nodes, including front-end node (FN) 141 and front-end (FN) node 142. Applicant server group 150 comprises a plurality of call application nodes, including call application node (CAN) 151, call application node (CAN) 152, and call application node (CAN) 153.

Each of front-end nodes 141 and 142 comprises an application level gateway (ALG) application, such as ALG application 143 in FN 141. Each one of call application nodes 151-153 contains control applications (or programs) for providing a plurality of call control functions or services, including, for example, policy decision function (PDF) applications, various types of application server (AS) applications, IMS-service switching functions (IM-SSF) applications, proxy call session control function (P-CSCF) applications, serving call session control function (S-CSCF) applications, interrogator call session control function (I-CSCF) applications, and other control software.

The IMS standard specifies the use of the Common Open Policy Service (COPS) protocol between gateway GPRS support nodes in external networks (e.g., GGSN 111-GGSN 114) and Policy Decision Function (PDF) applications internal to IMS 100. The PDF applications are a logical entity of the P-CSCF application(s). A PDF application functions as a Policy Decision Point for the service-based local policy control. The PDF application makes policy decisions based on session information and media-related information obtained from the P-CSCF application via the Gq interface (Diameter). The PDF application exchanges the decision information with the external GGSN via the Go interface (COPS and COPS-PR).

The expected COPS network traffic for the PDF applications varies from system to system. An IP multimedia subsystem according to the principles of the present invention provides easily scalability for handling varying traffic loads. The exemplary IMS 110 also is secure, fault tolerant, and highly available.

In IMS 110, the COPS stack is over TCP. The COPS protocol employs a client-server model where a target gateway GPRS support node (GGSN) sends request messages, update messages, and delete messages to the PDF applications in call application nodes 151-153 in IMS 110 and the PDF applications return decisions back to the target GGSN. Each gateway GPRS support node is identified by a unique GGSN ID. A gateway GPRS support node makes a connection to a PDF application that persists over the life of multiple transactions. Each transaction is a set of messages between the GGSN and the PDF application. Each transaction is identified by a Client Handle that is defined by the GGSN.

When a GGSN initiates a TCP connection, IP switch 130 load-shares the connection to one of a pool of available front-end nodes. The ALG application within the front-end node detects a connection request and accepts the connection from the GGSN. The ALG application then multicasts to all PDF application in IMS 110 the ALG group identity that has the interface for the GGSN ID. For each set of transactions initiated by the GGSN, the ALG application load-shares the transaction to a specific PDF application. The ALG application keeps an association between the Transaction ID and the PDF Group ID that services the transaction. For any transaction messages from the GGSN, the ALG application looks up the PDF Group ID associated with the Transaction ID and then sends the message to the PDF application. The PDF application sends messages targeted to a specific GGSN by sending to the ALG group that is handling that GGSN.

External devices, including gateway GPRS support nodes, may send messages that are targeted to a particular type of service. Each type of service is given an IP address provided by IP switch 130. As an example, there is a first IP address for the P-CSCF applications, a second IP address for the I-CSCF applications, a third IP address for the S-CSCF applications, and additional addresses for each type of AS application in IMS 110. IP switch 130 load-shares each received message to group 140 of front-end nodes.

The applications are organized into load-sharing groups by application type, such as P-CSCF, I-CSCF, S-CSCF, and one for each different type of AS. The mechanism for forming and using load-sharing groups is disclosed in U.S. patent application Ser. No. 10/038,878, filed on Dec. 31, 2001 and entitled "System and Method for Distributed Call Processing Using Load-Sharing Groups." The disclosure and teachings of U.S. patent application Ser. No. 10/038,878 are hereby incorporated by reference into the present application as if fully set forth herein.

FIG. 2 illustrates IP multimedia subsystem (IMS) 210 in greater detail according to an exemplary embodiment of the present invention. In FIG. 3, IMS 210 implements two front-end nodes (i.e., FN1 and FN2) and five call application nodes (i.e., CAN1, CAN2, CAN3, CAN4, and CAN5). The services or functions provided by CAN1-CAN5 and FN1 and FN2 are implemented as group services. Each load-sharing group consists of one of more primary-backup groups, where each primary-backup group is implemented as a primary (P) application and a backup (B) application. For example, in FIG. 2, an application server (AS) load sharing group is implemented as three primary-backup groups, AS1, AS2 and AS3. AS1 comprises a primary application, AS1(P), and a backup application, AS1(B). AS2 comprises a primary application, AS2 (P), and a backup application, AS2(B). AS3 comprises a primary application, AS3(P), and a backup application, AS3 (B).

The server applications AS1, AS2 and AS3 all perform the same function. The primary members AS1(P), AS2(P), and AS3(P) perform the actual work, while the backup members, AS1(B), AS2(B), AS3(B) remain available and are updated in the background in case of failure by the corresponding primary group member. In FIG. 2, only one AS application is shown. However, if other application server (AS) applications are implemented, the AS applications A, B and C may be identified as AS-A, AS-B, and AS-C. Primary-backup groups associated with, for example, AS-A, may then be identified as AS-A1(P) and AS-A1(B), AS-A2(P) and AS-A2(B), AS-A3 (P) and AS-A3(B), and so forth. For the sake of simplicity, the P-CSCF, I-CSCF, and S-CSCF applications are each illustrated as comprising only one primary-backup group. However, in alternate embodiments, each of these CSCF applications may comprise a plurality of primary-backup groups.

A group service provides a framework for organizing a group of distributed software objects in a computing network. Each software object provides a service. In addition, the group service framework provides enhanced behavior for determining group membership, what actions to take in the presence of faults, controlling unicast, multicast, and group-cast communications between members and clients for the group, and the like. A group utilizes a policy to enhance the behavior of the services provided by the group. Some of these policies include primary/backup for high service availability and load-sharing algorithms for distributing the loading of services within a network.

A client application establishes an interface to the load-sharing group. The client application may either load share a message to one of the members of the load-sharing group or may send the message directly to a specific member. Each primary-backup group is identified by a particular group identity. When a message is sent to a member that was selected by a load-sharing algorithm, this is referred to as "load-sharing" the message. When the message is sent using a group identity, this is referred to as "Group ID-based routing."

Each service type has its own load sharing group. As an example, there is a PDF load sharing group, a P-CSCF load sharing group, an I-CSCF load sharing group, an S-CSCF load sharing group, and a load sharing group for each type of AS application. A load sharing group has one or more members. Each member is the primary element in a primary-backup group and resides within some application that executes within a call application node. Applications may be added to or removed from a load-sharing group at any time—either through failure or configuration. As long as at least one member of the group is active, the corresponding service will be being provided.

As in the case of the AS applications, the PDF applications are implemented in a PDF load-sharing group (LSG) consisting of three primary-backup groups (PDF1, PDF2 and PDF3), where each primary-backup group is implemented as a primary (P) application and a backup (B) application. There are multiple numbers (i.e., 3 in FIG. 2) of these primary-backup groups and the exact number is scalable according to the number of processes and/or computing nodes that are used.

In order to be fault tolerant and to be highly available, the primary and backup members of each group in a load-sharing group are striped across the available CAN nodes. As an example, if three CAN nodes are implemented, the normal primary (P) for primary-backup Group 1 (PBG1) is in CAN1 and the backup (B) is in CAN2. The normal primary (P) for PBG2 is in CAN2 and the backup (B) is in CAN3. The normal primary for PBG3 (P) is in CAN3 and the backup (B) is in CAN1. By way of example, the three primary-backup group members of the PDF load-sharing group are striped across CAN1-CAN5.

The primary member is the service provider and equalizes the state of the primary with that of the backup. If the primary should fail, the backup takes over and continues to provide service until the primary is reloaded and assumes the role of primary. Failover is transparent to client users of the primary-backup group.

The ALG application located in each front-end node is also organized into a load-sharing group. In the example, the ALG load-sharing group comprises two primary-backup groups, namely ALG1 and ALG2. ALG1 and ALG 2 perform the same function. Each one of ALG1 and ALG2 consists of a primary member and a backup member. As before, the primary members, ALG1(P) and ALG2(P), and the backup members, ALG1(B) and ALG2(B), are striped across the available number of front-end nodes, which may be added to or removed at anytime transparent to the service that is being provided.

FIG. 3 is a flow diagram illustrating the operation of IP multimedia subsystem (IMS) 110 according to an exemplary embodiment of the present invention. It is assumed that five (5) call application nodes (i.e., CAN1-CAN5) and two (2) front-end nodes (FN1 and FN2) are implemented. Initially, external gateway GPRS support node (GGSN) 111 makes a TCP connection using the public PDF IP address provided by IP switch 130. Next, IP switch 130 load-shares the connection to one of the front-end nodes (process step 305).

By way of example, it is assumed that the ALG2(P) application in FN2 accepts the connection. ALG2(P) receives a COPS Open message indicating that GGSN 111 made the connection. ALG2(P) multicasts to the PDF LSG that the ALG2(P) in FN2 has the TCP connection to GGSN 111. This permits any PDF to originate a transaction or a close to GGSN 111 (process step 310).

GGSN 111 sends a Request message to ALG2(P) in FN2 (process step 3105). The Request message begins a transaction. ALG2(P) selects one of the available PDF applications using the PDF LSG and sends the Request message to, for example, PDF1(P) in CAN1. ALG2(P) in FN2 records the fact that CAN1 is handling this particular transaction identified by the Client Handle in the Request message. Subsequent messages from GGSN 111 for this Client Handle will be routed to the PDF1(P) in CAN1 (process step 320).

When the transaction is ended, GGSN 111 sends a Delete Request State message to ALG2(P) in FN2. ALG2(P) removes the association of the Client Handle with PDF1(P) in CAN1 (process step 320). When GGSN 111 initiates another transaction, ALG2(P) may assign PDF2(P) in CAN2 to handle the transaction, and so on. Each PDF application in CAN1-CAN5 knows where to send the response, because the message delivered to the PDF application contains the ALG2 (P) Group ID. The PDF application routes the message using Group ID-based routing.

IP switch 130 is configured to provide an IP address for TCP for the PDF service type. Gateway GPRS support nodes 111-114 send messages using the IP address for the PDF service type. Associated with the PDF service type IP address is a pool of IP addresses—one for each front-end node in the system. IP switch 130 load-shares TCP connections to a member of the IP pool.

If a front-end node should fail, IP switch 130 stops sending messages to that node. When the front-end node recovers, IP switch 130 again distributes messages to that node. IP switch 130 determines when the node fails by sending ping messages to the node or detecting a disconnection of the TDP interface. When a ping message is no longer returned or a disconnect is detected, IP switch 130 assumes that the node has failed.

ALG applications send messages to gateway GPS support nodes 111-114 using the TCP connection. IP switch 130 routes the messages to the correct GGSN. IP switch 130 is configured to support both IPV6 and IPV4 connections. NAT-PT is used to translate between IPV4 messages and IPV6 messages for IPV4 networks. IP switch 130 also supports IPV6 tunneling over IPV4 networks.

IP switch 130 is configured to have an IP address for the PDF service type. Front-end nodes may easily be added or removed by changing the PDF service type pool in IP switch 130. This enhances the scalability of IMS 110. IP switch 130 provides network address translation between the PDF service type IP address and the internal FN pool address. This enhances the security of the system. IP switch 130 detects front-end node failures and routes messages to available nodes. This enhances the high availability of the system.

IPV4 and IPV6 networks must be supported according to the 3GPP IMS requirements. The FN Ethernet interface to IP switch 130 is configured as an IPV6 socket. Call application nodes, such as CAN1-CAN5, are not required to be IPV6, but can be configured as such. By putting an IPV6 interface in the front-end node, call application node servers do not have to be responsible for address translation between IPV4 and IPV6 addresses. The ALG applications perform a simple translation between IPV4 to IPV6 by adding the IPV6 prefix [::ffff: 0:0].

Each front-end node is configured with a VIP (Virtual IP address), one for the PDF service type. The VIP address is referred to as virtual because it migrates between two different nodes. For example, for one P-CSCF service, one I-CSCF service, one S-CSCF service, and one AS, each front-end node would be configured with four VIP addresses. All of the P-CSCF VIP addresses (one for each FN) are configured into the P-CSCF pool in IP switch 130 for the P-CSCF service type. The same is true for the other service types.

As shown in FIG. 2, each ALG application is a member of a primary-backup group. The primary members and backup members are striped across the available front-end nodes. For two front-end nodes, FN1 and FN2, the primary for ALG1 is in FN1 and the backup for ALG1 is in FN2. Similarly, the primary for ALG2 is in FN2 and the backup for ALG2 is in FN1. All primary members join the ALG load-sharing group (LSG). The primary is completely stateless and no equalization with the backup occurs. Instead, the backup is used for service availability.

The primary for ALG1 (i.e., ALG1(P)) in FN1 adds the PDF VIP to the local Ethernet interface on initialization. ALG1(P) then sends a Gratuitous ARP message to IP switch 130 announcing that the VIP address is associated with the FN1 MAC address. A Gratuitous ARP message is an unsolicited message sent as an ARP Request message to IP switch 130. If, in the future, IP switch 130 sends an ARP Request message for the VIP address, ALG1(P) replies that the VIP is on the MAC address for FN1. If ALG1(P) fails, Group Services detects the failure and notifies ALG1(B) to become primary. The new primary, ALG1(B), in FN2 modifies the VIP/MAC address association in FN1 and associates the VIP address with the MAC address of FN2. The new primary in FN2 then sends a Gratuitous ARP message to IP switch 130 announcing the interface change. For any subsequent queries by IP switch 130 for the VIP address, ALG1(B) in FN2 provides the ARP Reply. This mechanism ensures that as long as one ALG application is running in IMS 110, COPS service access will always be available. This mechanism is called IP Takeover.

The ALG load-sharing group maintains a Group Service client interface to the PDF load-sharing group. The ALG LSG has a listener socket interface for the PDF service type VIP. When a connection comes in from a GGSN, the ALG LSG accepts the message and receives the COPS Client Open message. When the ALG application receives a COPS message over the PDF VIP address, the ALG application uses the associated client interface for the PDF service type load-sharing group. The ALG application uses the client interface to multicast a notification to all members of the PDF LSG that ALG is handling a particular GGSN. The ALG application load-shares each new transaction to a member of the PDF LSG and uses Group ID-based routing to send transaction messages to a particular PDF.

Periodically, the GGSN (i.e., GGSN 111) sends a COPS Keep Alive message to the PDF LSG. The ALG LSG load-shares the Keep Alive message to a PDF application. If the PDF application responds, the ALG application returns the response back to the GGSN. If the PDF does not respond, the ALG application continues to load-share the Keep Alive message until either a PDF responds or the number of available PDF servers is exhausted. If no response has been received, the ALG application does not send a response to the GGSN.

An important aspect of the present invention is the use of Group ID-based routing for COPS messages. For new COPS transactions, the ALG LSG load-shares the Request message to a particular PDF. The ALG LSG associates the Client Handle, which is the Transaction ID, with the PDF Group ID. Thereafter, each COPS message from GGSN 111 that has the same Client Handle is sent to the same PDF using Group ID-based routing. PDF applications and call application nodes may be added, removed, or fail, but the ALG LSG continues to operate as long as there is at least one PDF server running. This feature permits the system to be linearly scalable and highly available.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a telecommunication network, an Internet Protocol (IP) multimedia subsystem comprising:
   a processor;
   an IP switch capable of receiving Common Open Policy Service (COPS) messages from an external gateway GPRS support node; and
   a plurality of call application nodes capable of executing a plurality of Policy Decision Function (PDF) application groups, wherein said IP switch distributes said COPS messages to said plurality of call application nodes according to a load sharing algorithm, wherein the PDF application groups provide a framework for controlling unicast, multicast, and groupcast communications, wherein the IP switch is further configured to provide each of the plurality of call application node with a virtual IP (VIP) address that migrates across at least two nodes and is associated with at least two media access control (MAC) addresses of at least two nodes and is associated with each service the call application node is configured to perform, and wherein the IP switch is further configured to detect a failure of one of the plurality of call application nodes, and wherein the IP switch is configured to avoid sending data to a VIP with a detected failure.

2. The IP multimedia subsystem as set forth in claim 1, wherein a first one of said plurality of PDF application groups is executed on a first one of said plurality of call application nodes and is associated with a similar second one of said plurality of PDF application groups executed on a second one of said plurality of call application nodes separate from said first call application node.

3. The IP multimedia subsystem as set forth in claim 2, wherein said first and second PDF application groups form a first load-sharing group service application.

4. The IP multimedia subsystem as set forth in claim 3, wherein said first PDF application group comprises a first primary application executed on said first call application node and a first backup application associated with said first primary application.

5. The IP multimedia subsystem as set forth in claim 4, wherein said first backup application resides on a call application node other than said first call application node.

6. The IP multimedia subsystem as set forth in claim 5, further comprising a plurality of front-end nodes capable of executing a plurality of application level gateway (ALG) application groups, wherein said IP switch distributes said COPS messages to said plurality of front-end nodes for subsequent distribution to said plurality of call application nodes.

7. The IP multimedia subsystem as set forth in claim 6, wherein a first of said plurality of ALG application groups comprises a first primary ALG application executed on said first call application node and a first backup ALG application associated with said first primary ALG application.

8. The IP multimedia subsystem as set forth in claim 7, wherein said first backup ALG application resides on a call application node other than said first call application node.

9. A telecommunication network comprising:
a plurality of gateway GPRS support nodes of communicating according to the Common Open Policy Service (SIP) protocol;
a Internet protocol (IP) network coupled to said plurality of gateway GPRS support nodes; and
a Internet Protocol (IP) multimedia subsystem comprising:
an IP switch capable of receiving Common Open Policy Service (COPS) messages from said plurality of gateway GPRS support nodes; and
a plurality of call application nodes capable of executing a plurality of Policy Decision Function (PDF) application groups, wherein said IP switch distributes said COPS messages to said plurality of call application nodes according to a load sharing algorithm, and wherein the PDF application groups provide a framework for controlling unicast, multicast, and groupcast communications between the PDF application groups and the pluraltity of gateway GPRS support nodes, wherein the IP switch is further configured to provide each of the plurality of call application node with a virtual IP (VIP) address that migrates across at least two nodes and is associated with at least two media access control (MAC) addresses of at least two nodes and is associated with each service the call application node is configured to perform, and wherein the IP switch is further configured to detect a failure of one of the plurality of call application nodes, and wherein the IP switch is configured to avoid sending data to a VIP with a detected failure.

10. The telecommunication network as set forth in claim 9, wherein a first one of said plurality of PDF application groups is executed on a first one of said plurality of call application nodes and is associated with a similar second one of said plurality of PDF application groups executed on a second one of said plurality of call application nodes separate from said first call application node.

11. The telecommunication network as set forth in claim 10, wherein said first and second PDF application groups form a first load-sharing group service application.

12. The telecommunication network as set forth in claim 11, wherein said first PDF application group comprises a first primary application executed on said first call application node and a first backup application associated with said first primary application.

13. The telecommunication network as set forth in claim 12, wherein said first backup application resides on a call application node other than said first call application node.

14. The telecommunication network as set forth in claim 13, further comprising a plurality of front-end nodes capable of executing a plurality of application level gateway (ALG) application groups, wherein said IP switch distributes said COPS messages to said plurality of front-end nodes for subsequent distribution to said plurality of call application nodes.

15. The telecommunication network as set forth in claim 14, wherein a first of said plurality of ALG application groups comprises a first primary ALG application executed on said first call application node and a first backup ALG application associated with said first primary ALG application.

16. The telecommunication network as set forth in claim 15, wherein said first backup ALG application resides on a call application node other than said first call application node.

17. A method comprising:
receiving at least one Common Open Policy Service (COPS) protocol messages from an external IP network; and
distributing the COPS protocol messages to the plurality of call application nodes according to a load sharing algorithm, wherein the PDF application groups provide a framework for controlling unicast, multicast, and groupcast communications wherein an IP switch is further configured to provide each of a plurality of call application node with a virtual IP (VIP) address that migrates across at least two nodes and is associated with at least two media access control (MAC) addresses of at least two nodes and is associated with each service the call application node is configured to perform, and wherein the IP switch is further configured to detect a failure of one of the plurality of call application nodes, and wherein the IP switch is configured to avoid sending data to a VIP with a detected failure, wherein the plurality of call application nodes are configured to execute a plurality of Policy Decision Function (PDF) application groups.

18. The method as set forth in claim 17, wherein a first one of the plurality of PDF application groups is executed on a first one of the plurality of call application nodes and is associated with a similar second one of the plurality of PDF application groups executed on a second one of the plurality of call application nodes separate from the first call application node.

19. The method as set forth in claim 18, wherein the first and second PDF application groups form a first load-sharing group service application.

20. The method as set forth in claim 19, wherein the first PDF application group comprises a first primary application executed on the first call application node and a first backup application associated with the first primary application.

* * * * *